United States Patent [19]

Yamaguchi et al.

[11] Patent Number: 4,720,811
[45] Date of Patent: Jan. 19, 1988

[54] MICROPROCESSOR CAPABLE OF STOPPING ITS OPERATION AT ANY CYCLE TIME

[75] Inventors: Noboru Yamaguchi, Higashiyamato, Japan; Kunio Uchiyama, Pittsburgh, Pa.; Haruo Koizumi, Tokyo, Japan; Yoshimune Hagiwara, Hachioji, Japan; Tadahiko Nishimukai, Sagamihara, Japan

[73] Assignee: Hitachi, Ltd., Japan

[21] Appl. No.: 855,942

[22] Filed: Apr. 25, 1986

[30] Foreign Application Priority Data

Apr. 26, 1985 [JP] Japan .............................. 60-88503
Jul. 1, 1985 [JP] Japan .............................. 60-144254

[51] Int. Cl.⁴ .............................................. G06F 9/00
[52] U.S. Cl. .................................................. 364/900
[58] Field of Search .............................. 364/200, 900

[56] References Cited

U.S. PATENT DOCUMENTS 4,387,423  6/1983  King et al. ..................... 364/200

Primary Examiner—Thomas M. Heckler
Assistant Examiner—John G. Mills
Attorney, Agent, or Firm—Antonelli, Terry & Wands

[57] ABSTRACT

Herein disclosed is a method of controlling a microprocessor in accordance with the present invention characterized in that, when the microprocessor for executing a microprogram in accordance with clock cycles $\Phi_1$ and $\Phi_2$ receives a command (i.e., STOP signal) for stopping a normal operation from the outside, a freezing signal (i.e., FRZ signal) synchronizing with the clock cycles is generated to bring the operation being executed into a stopped state.

2 Claims, 11 Drawing Figures

MICROPROCESSOR CAPABLE OF STOPPING ITS OPERATION AT ANY CYCLE TIME

BACKGROUND OF THE INVENTION

The present invention relates to a microprocessor and its control method and, more particularly, to a microprocessor, which is suitable for facilitating its own fault diagnosis and debugging of a microprogram, and its control method.

The microprocessor is becoming more and more large-scale, complicated and multi-functioned as the high integration of an LSI advances. In accordance with this, the microprogram for realizing one microinstruction has a tendency to become longer and longer to make it more difficult to conduct the debugging of the microprogram and the various tests and fault diagnosis of the microprocessor.

In case the operation of the microprocessor is to be stopped, there is in the prior art a method of applying a HALT signal to the HALT pin. In the case of the MC68000, for example, when the HALT signal is input, the MC68000 brings its address bus, data bus and bus control signal into a high-impedance state to stop its operation, at the instant when it completes a bus cycle if it is executing the bus cycle, and instantly if there is no bus cycle being executed.

In this way, the microprocessor is not instantly brought into its stopped state, even if the HALT signal is fed during the execution of the bus cycle, so that it does not stop its operation before it executes the microprogram until the start of a subsequent bus cycle. In other words, the microprocessor cannot stop its operation before it comes to the boundary of the bus cycle. Nor can the operation of the microprocessor be stopped or an arbitrary boundary of a plurality of clock cycles composing the bus cycle.

The HALT pin of the microprocessor is so intrinsically provided that the external bus can be used with a DMAC (i.e., Direct Memory Access Controller) and another microprocessor, and is not intended to have the fault diagnosis of the microprocessor or itself or the LSI as its main target. As a result, the operation stop by the HALT signal cannot sufficiently cope by itself with the microprocessor used as the LSI which is being integrated to a higher level, made to have a higher performance and be more complicated.

SUMMARY OF THE INVENTION

In order to facilitate the fault diagnosis and the debugging of a microprogram, the microprogram to be executed is stopped at any time so that the individual states inside of the microprocessor at that time can be observed. This is a function to trace the microprogram step by step.

For example, the MC68000 may have several tens to one hundred and several tens, at the largest, of the steps of the microprogram to be executed for the time period for one to subsequent bus cycles. The impossibility of observing the state transitions in the microprocessor would make the fault diagnosis more difficult. This makes it necessary to develop a method of stopping at any step to observe the state so that the microprogram may be executed step by step. If the operation could be stopped at each step of the microprogram, on the other hand, the fault diagnosis and the debugging of the microprogram itself would be easy to invite notable advantages in the debugging in the development of a microprocessor LSI and the selecting tests when the LSI is to be shipped.

An object of the present invention is to provide means for stopping the execution of the microprogram by a microprocessor at any cycle time so as to facilitate the fault diagnosis and the debugging of the microprogram in the microprocessor for executing the microprogram according to the clock cycle.

Another object of the present invention is to provide a method of an apparatus for controlling the microprocessor which is capable of executing the microprogram step by step.

In order to achieve the above-specified objects, a method of controlling the microprocessor in accordance with the present invention is characterized in that, when the microprocessor for executing a microprogram in accordance with clock cycles $\Phi_1$ and $\Phi_2$ receives a command (i.e., STOP signal) for stopping a normal operation from the outside, a freezing signal (i.e., FRZ signal) synchronizing with the clock cycles is generated to bring the operation being executed into a stopped state.

DESCRIPTION OF THE PREFERRED EMBODIMENTS

The present invention will be described in the following in connection with various embodiments thereof with reference to the accompanying drawings.

Figure 1:
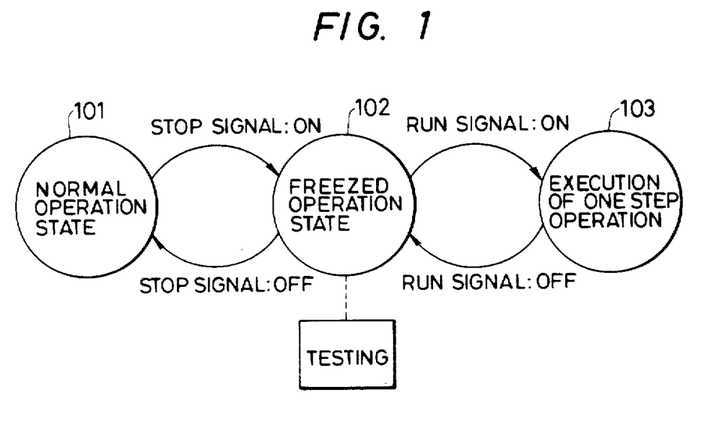
FIG. 1 is a diagram showing a state transistion of one embodiment of the present invention.
Figure 2:
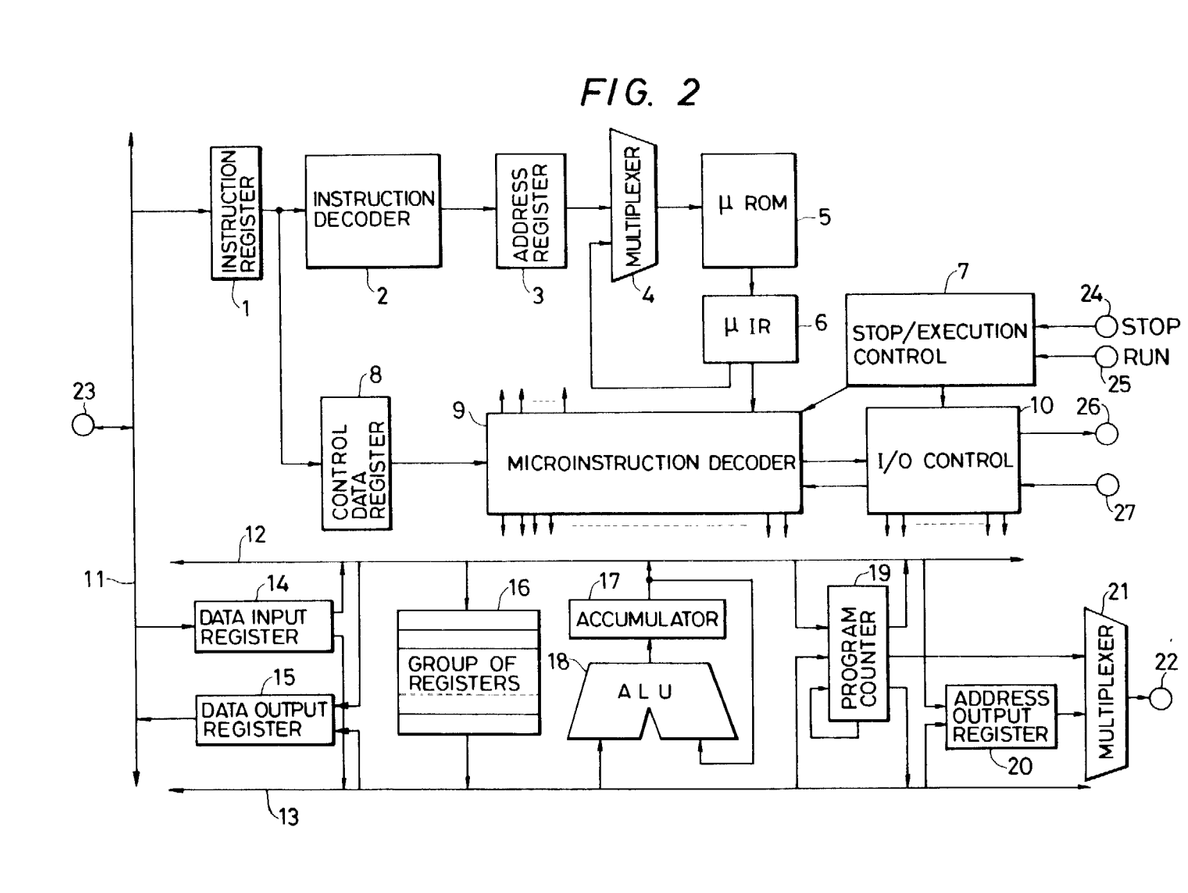
FIG. 2 is a schematic block diagram showing a microprocessor according to the embodiment of the present invention.

FIG. 2 is a schematic block diagram showing the microprocessor according to one embodiment of the present invention, and FIG. 1 is a diagram showing the state transition of FIG. 2.

In FIG. 2, an instruction register 1 stores the instruction code which is input thereto through an I/O (i.e., input/output) pin 23 and an internal data bus 11. Reference numeral 2 denotes an instruction decoder for logically decoding the instruction code. Numeral 3 denotes a microinstruction ahead address register for determining the ahead address of a microprogram ROM (i.e., μROM) 5 on the basis of the instruction code. Numeral 4 denotes a multiplexer for switching the ahead address and another address. The microprogram ROM 5 stores a microprogram. Numeral 6 denotes a microinstruction register (i.e., μIR) for storing the contents of data coming from the microprogram ROM 5. Numeral 7 denotes a stop/execution control circuit for bringing the present microprocessor into an execution or stop state in response to a command for stopping the operation, a stop signal or a command for executing the operation of one cycle from input pins 24 and 25 by a method to be described hereinafter. Numeral 8 denotes a control data register for storing contents such as computations from the instruction code. Numerals 9 and 10 denote a microinstruction decoder and an I/O control circuit to be described hereinafter, respectively. Numerals 12, 13 and 14 denote a data bus A, a data bus B, and a data input register for storing the data coming from the internal data bus 11, respectively. Numeral 15 denotes a data output register for storing the data to be sent to the internal data bus 11. Numeral 16 denotes a group of registers for storing data necessary for the processing. Numeral 17 denotes an accumulator for temporarily storing the output of an ALU (i.e., Arithmetic and Logic Unit) 18. This ALU 18 conducts an arithmetic operation and a logic operation. Numeral 19 denotes a program counter. Numeral 20 denotes an address output register. Numeral 21 denotes a multiplexer for selecting either the address of a stored instruction from the program counter 19 or the address from the address output register 20 to send the selected one to the address bus through an output pin 22. Numeral 26 denotes a group of pins for outputting a data I/O control signal from the I/O control circuit 10. Numeral 27 denotes a group of pins for inputting a data I/O acknowledge signal to the I/O control circuit 10.

The I/O control circuit 10 of the present microprocessor conducts the following individual controls:
1 the control for introducing the information of the I/O output pin 23 into the instruction register 1 through the internal data bus 11; 2 the control for introducing the information of the I/O pin 23 into the data input register 14; 3 the control of sending the contents of the data output register 15 to the I/O pin 23; 4 the control for sending the contents of the program counter 19 or the address output register 20 to the address bus through the multiplexer 21 and the output pin 22; and 5 other necessary controls.

Next, the microinstruction decoder 9 conducts the following individual controls: 1 the control for selecting one of the grouped registers 16; 2 the control for selecting the function of the ALU 18; 3 the control for transferring the data between the individual registers through the data bus A 12 and the data bus B 13;
4 the control for decoding the instruction code of the instruction register 1 by the instruction decoder 2 to take out the ahead address of that instruction in the microprogram ROM 5; 5 the control for the contents such as the computations to be stored in the control data register 8, i.e, the control code portion of the microinstruction decoder 9 itself from the instruction code of the instruction register 1; 6 the fetching control from the microprogram ROM 5; and 7 other necessary controls. Incidentally, the respective controls by the I/O control circuit 10 and the microinstruction decoder 9, although not shown in the drawing, execute every clock cycle in synchronism with the internal clocks $\Phi_1$ and $\Phi_2$.

Subsequently, the stop/execution control circuit 7 for stopping the aforementioned individual control operations and executing only one clock cycle after that stop will be described in detail with reference to FIGS. 3 and 4.

Figure 3:
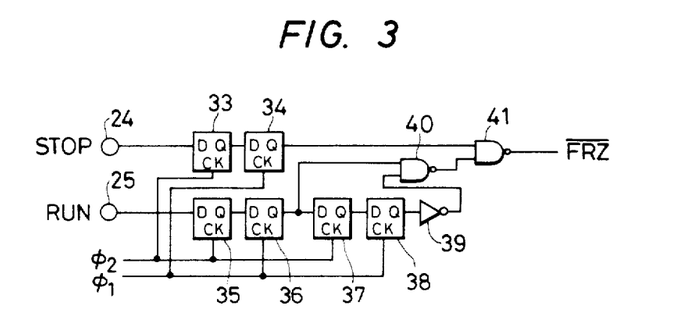
FIG. 3 is a diagram showing a circuit for generating a $\overline{FRZ}$ signal for controlling the microprocessor to stop and execute its operation.
Figure 4:
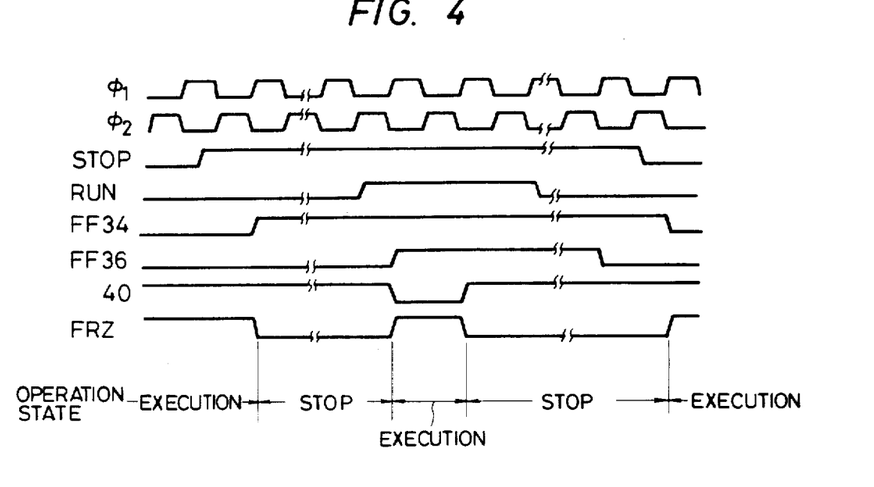
FIG. 4 is a time chart showing the operation of FIG. 3.

FIG. 3 is a circuit diagram showing the stop/execution control circuit 7. In FIG. 3: reference numerals 33 to 38 denote D flip-flop circuits (i.e., D-FFs); numeral 39 denotes an inverter; and numerals 40 and 41 denote NAND circuits.

The stop/execution control circuit 7 receives the STOP signal at a high level "H" applied to the input pin 24 in synchronism with the internal clocks $\Phi_1$ and $\Phi_2$ and sends the $\overline{FRZ}$ signal at a low level "L" from the NAND circuit 41 to bring the microprocessor into a stopped or frozen state by the method to be described hereinafter. Incidentally, the internal clocks $\Phi_1$ and $\Phi_2$ are two-phase nonoverlapped clocks.

After this, the high level "H" of the RUN signal applied to the input pin 25 is received in synchronism with the internal clocks $\Phi_1$ and $\Phi_2$ like the STOP signal by the D-FFs 35 and 36. The clock cycles are reduced to one by the D-FFs 37 and 38, and the FRZ signal at the high level "H" is sent out from the NAND circuit 41 so that the microprocessor in the stopped state is brought again into the stopped state after it has been caused to execute the microprogram only for one clock cycle. The operation is stopped until the STOP signal of the input pin 24 takes the low level "L", and the FRZ signal is raised as many times as the number of receptions of the RUN signal for that period to the high level "H" so that the microprogram is executed step by step. Incidentally, the D-FFs 37, 38 delay the RUN signal by one clock cycle, and the NAND circuit 40 generates pulses of one clock cycle from both the outputs of the D-FFs 36 and 38.

More specifically, the FRZ signal is basically asserted in response to the assertion of the STOP signal and is negated only one clock cycle by the aforementioned circuit operation when the RUN signal is asserted in the meanwhile. As a result, the RUN signal input from the outside is one at the high level "H" and equal to or longer than one clock cycle so that it may be converted inside into a pulse signal of one clock cycle. In this circuit, moreover, consideration is taken such that the diagnosis control circuit to be provided outside can produce the STOP signal and the RUN signal independently of the internal clocks $\Phi_1$ and $\Phi_2$.

In order that the stop on the boundary at any clock cycle and the execution of only one cycle may be realized in response to the FRZ signal generated above, as is intended by the present invention, an AND may be taken on principle between the FRZ signal and any of the control output signals sent from the microinstruction decoder 9 and the I/O control circuit 10 to conduct the various controls in response to the new control output signals. Despite this fact, however, the AND of all the control output signals with the FRZ signal need not always be conducted. The control output signals required are those for setting the FFs and the registers.

More specifically, the ANDs are taken of the FRZ signal only with a set signal (i.e., SET) for setting not only various registers such as the instruction register 1, the microinstruction ahead address register 3, the microinstruction register 6, the control data register 8, the data input register 14, the data output register 15, the grouped registers 16, the accumulator 17, the program counter 19 or the address output register 20 but also the state FFs in the I/O control circuit 10, thereby to fix the data. On the other hand, no AND of the FRZ signal is required with the control output signals such as the function selection signal of the ALU 18 or the selection signal of the output registers to the data bus A 12 or the data bus B 13. This is because it is thought that the microprocessor is in its stopped state even with the operation of the ALU 18 if the internal state is unchanged.

Next, the embodiments of the AND operation between the FRZ signal and the control output signals will be described in detail with reference to FIGS. 5 and 6.

Figure 5:
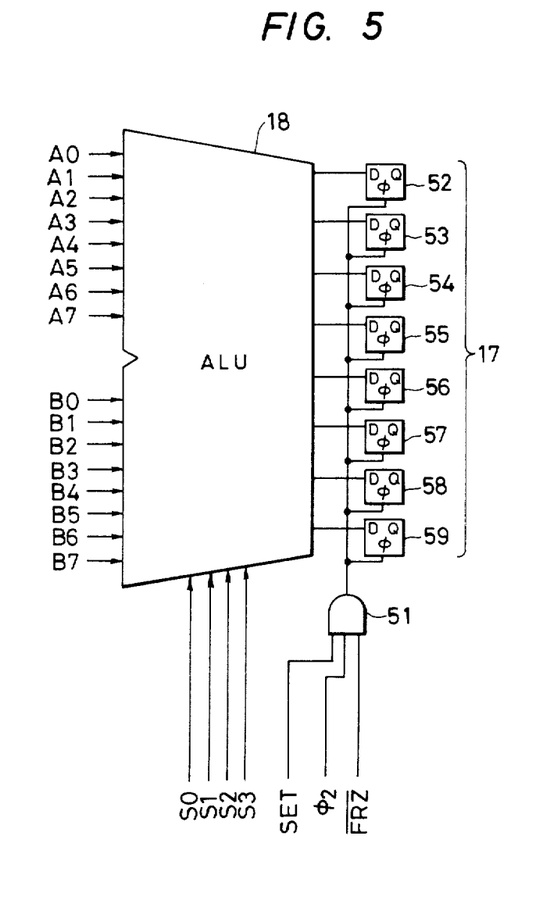
FIG. 5 is a diagram showing an example for making a SET signal invalid with the $\overline{FRZ}$ signal.

FIG. 5 shows an example for the SET signal and the case in which the output of the ALU 18 is to be stored in the accumulator 17. In FIG. 5, reference numeral 51 denotes a 3-input AND circuit, and numerals 52 to 59 denote D-FFs constructing the accumulator 17. Incidentally, the ALU 18 inputs two groups of data A0 to A7 and B0 to B7, which are processed by function selection signals S0 to S3 in accordance with designated functional contents, and the results are output to the D-FFs 52 to 59. On the other hand, the function selection signals S0 to S3 and the SET signal are control output signals by which the microinstruction decoder 9 decodes the microprogram logically.

The D-FFs 52 to 59 receive and store the aforementioned results, when all the SET signal, the internal clock $\Phi_2$ and the $\overline{FRZ}$ signal are at the high level "H", but don't when the $\overline{FRZ}$ signal is at the low level "L" (i.e., in the stopped state).

Thus, by replacing the 2-input AND circuit of the prior art by the 3-input one to add the FRZ signal, the data transfer from the ALU 18 to the accumulator 17 is blocked to bring the microprocessor into the stopped state when the FRZ signal is at the low level "L". On the other hand, the sET signal of another register is also executed by a method similar to that of the present example. Moreover, the method of making the control output signals invalid in response to the FRZ signal is not limited to the method of taking the AND with the control output signals themselves, as in the case of the present example, but can be modified into another method by which the control output signals are made invalid before the decoding operation, i.e., at the input of the decoder such as between the microinstruction register 6 and the microinstruction decoder 9.

Figure 6:
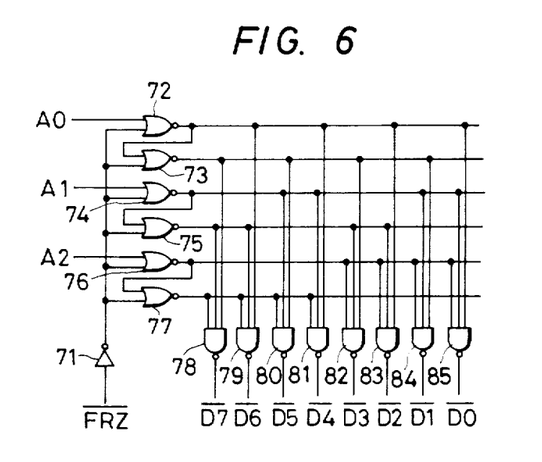
FIG. 6 is a diagram showing an example for making all the outputs of a decoder invalid with the FRZ signal.

FIG. 6 is a decoder circuit diagram showing an example in which all the outputs of the decoder are made invalid. In FIG. 6: reference numeral 71 denotes an inverter; numerals 72 to 77 denote 2-input NOR circuits; and numerals 78 to 85 denote NAND circuits.

This decoder decodes the input data A0 to A2, which are input to the NOR circuits 72 to 77, in a predetermined combination by the NAND circuits 78 to 85 to send out decoded output data D0 to D7. When the $\overline{FRZ}$ signal takes the low level "L", on the other hand, all the outputs of the NOR circuits 72 to 77 take the low level "L" whereas all the outputs of the NAND circuits 78 to 85 take the high level "H".

Thus, by replacing the inverter of the prior art by the 2-input NOR circuits 72 to 77 and by adding the inverter 71 to introduce the $\overline{FRZ}$ signal, the input data A0 to A2 are blocked from being decoded, when the FRZ signal is at the low level "L", to bring the microprocessor into the stopped state. In the case of this method, incidentally, the reduction in the number of the AND gates may be executed on the input side because the decoder usually has a smaller number of input lines than the number of output lines.

From the description thus far made, as shown in FIG. 1, the microprocessor of the present invention sets the $\overline{FRZ}$ signal at the low level "L", if the STOP signal is applied when the microprogram is being normally executed (in a state 101), to bring the operation into the stopped or frozen state (i.e., in a state 102) on the boundary of the clock cycle. Incidentally, this stopped state is continued until the STOP signal disappears. In the meanwhile, moreover, the signal levels at individual portions are observed to check the operational content by an electron beam tester for extracting the contents of the internal registers and the FFs to the outside by the scan path method or the like (in a state 104).

If the RUN signal is applied in that stopped state, the $\overline{FRZ}$ signal at the low level "L" is raised to the high level "H" for the time period of only one clock cycle, and one step of the microprogram is executed until the stopped state is restored (in a state 103). After this, the contents of the individual portions are extracted as in the aforementioned operation and have their levels observed to check the situations after the execution of one step.

Thus, it becomes possible to stop the microprocessor on the boundary of any clock cycle and to execute the subsequent microprogram step by step. As a result, the microinstruction can be stopped in any position for the various checks even if it has a long time bus access and a large number of steps. This remarkably facilitates not only the debugging of the microprogram but also the debugging and fault diagnosis in the control and controlled circuits. When the microprocessor is to be developed as an LSI, moreover, the working time periods for the debugging and fault diagnosis can be shortened, and the patterns for the selection tests upon the mass-production can be easily formed.

In the present embodiment, it has been implicitly assumed that the control output signals to be made invalid are those synchronized with the internal clock $\Phi_1$ and that the timing for executing the control outputs is set at the internal clock $\Phi_2$. In case, however, there are present control output signals which are synchronized with not only the $\Phi_1$ but also the $\Phi_2$, the FRZ signal must have two components.

Figure 7:
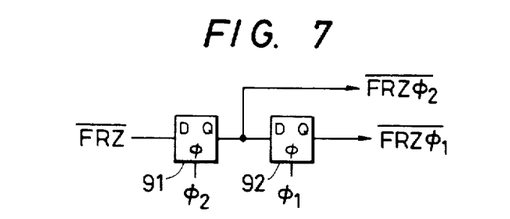
FIG. 7 is a diagram showing an example of the circuit for converting the $\overline{FRZ}$ signal into signals $\overline{FRZ\Phi_1}$ and $\overline{FRZ\Phi_2}$ synchronized with both the clock cycles $\Phi_1$ and $\Phi_2$.
Figure 8:
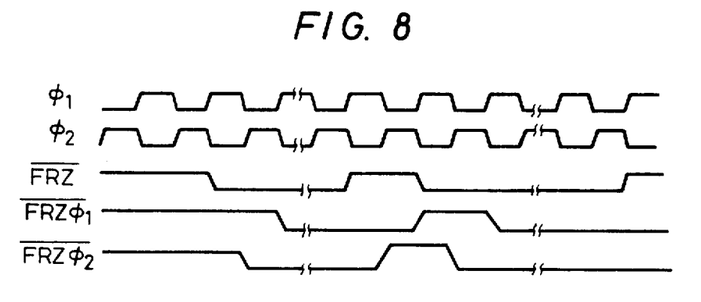
FIG. 8 is a time chart showing the operation of FIG. 7.

The generation of the two FRZ signals is exemplified in FIGS. 7 and 8. Reference numerals 91 and 92 appearing in FIG. 7 denote D-FFs which are packaged in the stop/execution control circuit 7.

As shown in FIG. 8, the FF 91 delays the FRZ signal, which is output by the NAND circuit 41 of FIG. 3, by a half cycle in accordance with the internal clock $\Phi_2$ to output an $\overline{FRZ\Phi_2}$ signal. On the other hand, the FF 92 delays the $\overline{FRZ\Phi_2}$ signal of the FF 91 by a half cycle as in the aforementioned operation in accordance with the internal clock $\Phi_1$ to output an $\overline{FRZ\Phi_1}$ signal which is delayed by one clock cycle from the FRZ signal.

Thus, by generating the $\overline{FRZ}$ signal $\Phi_2$ delayed merely by a half cycle from the $\overline{FRZ}$ signal and the $\overline{FRZ\Phi_1}$ signal further delayed by a half cycle, the control output signals synchronized with the internal clock $\Phi_1$ can be made invalid by the $\overline{FRZ\Phi_1}$ signal, whereas the control output signals synchronized with the internal clock $\Phi_2$ can be made invalid by the $\overline{FRZ\Phi_2}$ signal.

As has been described hereinbefore, in the microprocessor according to the present invention for executing the microprogram in accordance with the clock cycle, the FRZ signal synchronized with the aforementioned clock cycle is produced in response to the STOP signal from the outside to make the control output signals invalid so that the microprocessor can be stopped on the boundary of any clock cycle. In this stopped state, the FRZ signal is likewise brought into the nongenerated state for the time period of only one clock cycle in response to the RUN signal from the outside to release the aforementioned invalidation so that the microprogram can be executed for only one clock cycle and then stopped. As a result, the fault diagnosis of the microprocessor and the debugging of the microprogram can be drastically facilitated.

Next, a test circuit for the logic LSI such as the microprocessor will be described in the following.

As the integration of the LSI is improved, it becomes the more difficult to form a test pattern having a fault detecting efficiency sufficient for testing the LSI. In order to eliminate this difficulty, it becomes necessary to make such restrictions from the logic design stage as facilitate formation of the test pattern so that the internal logic of the LSI may be constructed in accordance with the restrictions. This method is represented by the "Level Sensitive Scan Design (i.e., LSSD)" method, as is disclosed on pp. 462 to 468 of Proc. of 14the Ann. Design Automation Conf., 1977, which is entitled "A Logic Design Structure For LSI Testability". As the logic restrictions represented by that method, it is necessary to make such a logic structure as can scan any data in any flip-flop used in the LSI and scan out the value of the flip-flop. Moreover, the internal timing signal to be fed to each flip-flop has to be fed directly from the external pin of the LSI.

Figure 9:
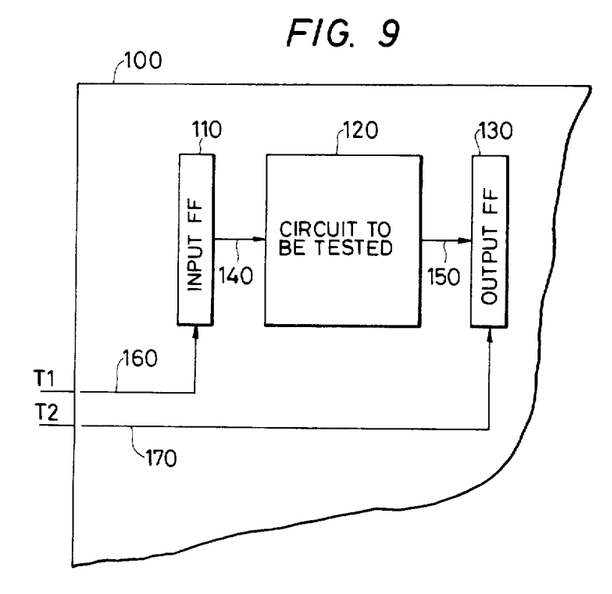
FIG. 9 is a diagram showing the internal circuit of an LSI of the prior art.

FIG. 9 shows a circuit example of the LSI using the above-specified method. A circuit 120 constructed in an LSI 100 is connected with an input FF 110 and an output FF 130. When the circuit 120 is to be tested, data is first scanned in the input FF 110. Then, a group of input signals 140 are sent out to the circuit 120, in which a processing such as an arithmetic operation is conducted, and a group of output signals 150 are sent out to the output FF 130. After this, a data introducing timing signal 170 is fed to the output FF 130. In this meanwhile case, a data introducing timing 160 signal is not fed to the input FF 110 so that the input FF 110 holds its value. The data introduced into the output FF 130 is scanned out to the outside of the LSI 100 and is referred to an expected value, thus completing the test.

In order to test the internal circuit of the LSI in those ways, it is necessary that the feeds of the timing signals 160, 170 to the internal flip-flops can be freely controlled from the outside of the LSI. This has raised a restrictive item in the aforementioned LSSD method that the timing signals used in the LSI is to be enabled to be individually fed directly from the external pins of the LSI. In the LSI such as the microprocessor, however, it is common that those timing signals are generated inside, and it has been difficult to satisfy the above-specified restrictive item.

In an LSI, such as a microprocessor having a timing generating circuit built therein, according to the present invention, there is provided a test circuit which can control the feed of timing signals when the internal circuit is tested.

With this view, according to the present invention, there are provided a circuit for suppressing feed of timing signals generated in the LSI and a circuit for making it possible to feed any of the timing signals suppressed. As a result, when the internal circuit of the LSI is to be tested, only the data introducing timing of the output flip-flop of the circuit to be tested can be selectively fed.

Figure 10:
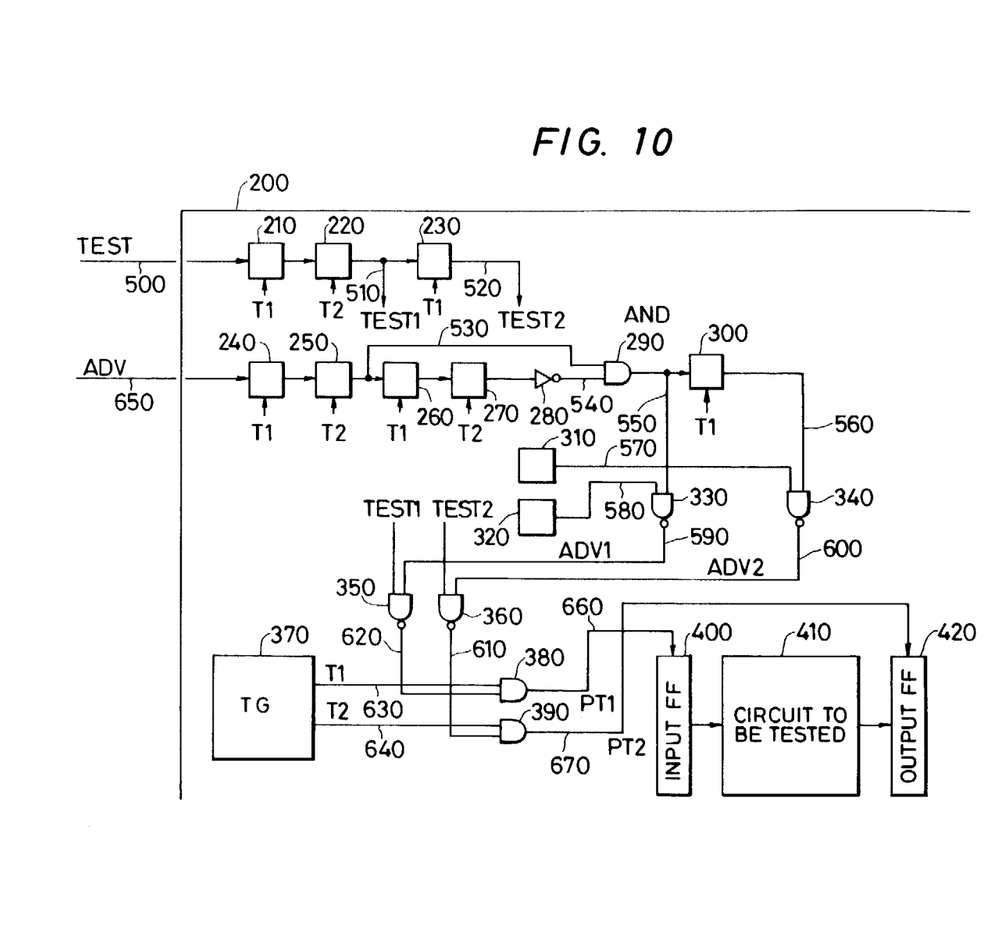
FIG. 10 is a diagram showing the logic structure of the LSI having a test circuit therein.
Figure 11:
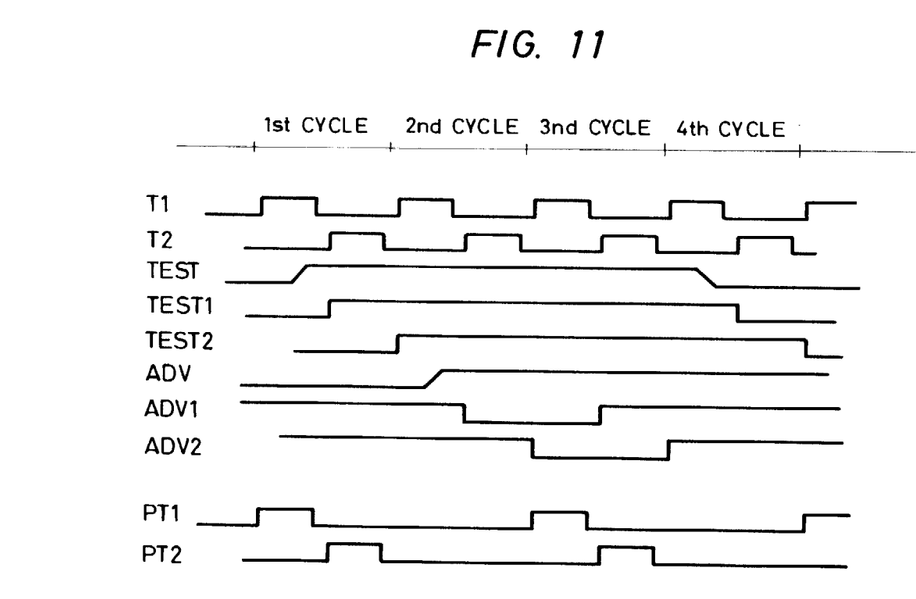
FIG. 11 is a timing chart showing the major signals of FIG. 10.

FIG. 10 shows an example of the LSI which has the test circuit of the present invention built therein. This LSI 200 has built therein a timing generating circuit (i.e., TG) 370 by which two-phase nonoverlapping timing signals (i.e., T1 and T2) 630 and 640 are fed at all times. FIG. 11 shows relationships between the timing charts of the timing signals T1 and T2 and the operation cycles of that LSI. This LSI 200 has as its testing external input signals at least a TEST signal 500 for indicating a testing mode and an ADV signal 650 for indicating a clock advancing (or clock driving). The TEST signal 500 is set in an asserted state when the internal circuit of the LSI 200 is to be tested. On the other hand, the ADV signal is asserted when the timing for introducing the output state of the circuit to be tested into an output latch is fed. Flip-flops 210 and 220 are of the D-type for introducing the TEST signal 500 while synchronizing the state of the same with the internal timing. The flip-flops 210 and 220 are fed with the timing signals T1 and T2, respectively, to internally produce a signal (i.e., TEST1) 510 synchronized with the rise of the timing signal T2. A TEST2 signal 520 is prepared by delaying the TEST1 signal 510 so that it may be switched at the rise of the timing signal T1, and a flip-flop 230 is one for this delay and is fed with the timing signal T1. FIG. 11 shows relationship between the external TEST signal 500 and the TEST1 and TEST2 signals 510 and 520 synchronized inside.

Reverting to FIG. 10, flip-flops 240 and 250 are of the D-type for introducing the state of the ADV signal 650 while synchronizing it with the internal timing. The flip-flops 240 and 250 are fed with the timing signals T1 and T2, respectively. Flip-flops 260 and 270, an inverter 280 and an AND gate 290 are circuits for further shaping a signal 530 synchronized internally from the ADV signal 650 to generate a signal 550 which is asserted by one cycle only at the rise of the signal 530. The flip-flops 260 and 270 are fed with the timing signals T1 and T2, respectively. The signal 530 is delayed by one cycle, and the desired signal 550 is generated by taking an AND between the inverted signal of that delayed signal and the signal 530. A signal 560 is one which is so delayed from the signal 550 as is switched at the rise of the timing signal T1. A flip-flop 300 is one for this delay and is fed with the timing signal T1.

Flip-flops 310 and 320 are provided for holding the types of clock advancing. If a state "1" is held in the flip-flop 310, more specifically, only one pulse of a 1st-phase timing signal (i.e., PT1) 660 is fed upon the clock advancing to the logic inside of the LSI. If the state "1" is held in the flip-flop 320, on the other hand, only one pulse of a 2nd-phase timing signal (i.e., PT2) 670 is fed upon the clock advancing. If a state "0" is held in the aforementioned flip-flop, on the contrary, the corresponding timing signal is not fed upon the clock advancing.

Gates 330, 340, 350, 360, 380 and 390 realize the above-specified controls. The NAND gate 330 takes a NAND between the signal 550, which is synchronized with the internal timing T2 and shaped into one cycle, and an output signal 580 of the flip-flop 320 to output an advance indicating signal (i.e., ADV1) 590 for the PT1 signal 660. Likewise, the NAND gate 340 outputs an advance indicating signal (i.e., ADV2) 600 for the PT2 signal 670. FIG. 11 shows the relationships between the external ADV signal 650 and the ADV1 and ADV2 signals 590 and 600. The clock advancing is indicated when the ADV1 and ADV2 signals 590 and 600 are negated.

The NAND gate 350 takes a NAND between the TEST1 signal 510 and the ADV1 signal 590 to output a signal 620. An AND is taken between that signal 620 and the timing signal T1 by the AND gate 380 to produce the timing signal (PT1) 660 to be really used in the internal logic flip-flop. The switching timing between the TEST1 signal 510 and the ADV1 signal 590 is the rise of the timing signal T2 and is held for one cycle so that the signal 620 can completely cover the rising pulse of the timing signal 630. The NAND gate 360 and the AND gate 390 are gates for likewise controlling the timing signal (PT2) 670.

Next, the sequence for testing an internal circuit 410 of the LSI 200 by using the testing circuit thus far described will be described in the following. In the normal operation, the TEST signal 500 and the ADV signal 650 are negated. As a result, the timing PT1 signal 660 and PT2 signal 670 are fed to an input FF 400 and an output FF 420 of the internal circuit 410, respectively. In order to test the internal circuit 410, the feed of the PT1 signal 660 and the PT2 signal 670 is first suppressed by asserting the TEST signal 500. Next, in this state, a data is scanned in the input FF 400. As the scan-in method, there can be conceived a method of connecting all the flip-flops in the chip in series to make a shift register (which includes 400 and 420, or 310 and 320) thereby to conduct a writing operation in series with the shift clock (although not shown in the drawing). The scan-out method reverses the order of the operation steps to conduct the reading operation in series.

On the other hand, a variety of scan methods can be applied, including the random scan method by which addresses are allocated to the flip-flops in the chip. Moreover, the types of the clock advancing are scanned in the flip-flops 310 and 320. In this case, the flip-flop 320 is brought into the stage "0" whereas the flip-flop 310 is brought into the state "1". After this, the clock advancing is indicated by asserting the ADV signal 650. In this case, only one pulse of the PT2 signal 670 providing the data incorporating timing of the output FF 420 is fed in accordance with the states of the flip-flops 310 and 320 so that the output result of the internal circuit 410 is stored. At this clock advancing, the PT1 signal 660 is not fed so that the data in the input FF 400 is held as it is. After this, the data in the output FF 420 is scanned out and compared with the expected value to conduct the test.

The aforementioned scan-in and scan-out methods are realized by the use of a well-known method such as the aforementioned LSSD method.

The present embodiment exemplifies the LSI using a 2-phase nonoverlapping timing, but the present invention can be easily applied to the LSI using another timing system. Moreover, the LSI is enabled to have no flip-flop for holding the type of the clock advancing, and the information can be directly input from the external pin. Still moreover, the testing external pin can be shared with another signal pin.

As has been described hereinbefore, according to the present invention, the LSI having the timing generating circuit therein is enabled to suppress the feed of the timing signals and to feed any of the timing signals suppressed to provide an effect that said LSI can be easily tested.

What is claimed is:

1. A microprocessor comprising:
   (1) a logic circuit for effecting a desired logic operation;
   (2) a timing pulse generator circuit for generating at least a first timing pulse and a second timing pulse;
   (3) an input flip-flop circuit, an output of which is connected to an input of said logic circuit;
   (4) an output flip-flop circuit, an input of which is connected to an output of said logic circuit;
   (5) means coupled to said timing pulse generator circuit for controlling supply an non-supply of said first timing pulse and said second timing pulse to said input flip-flop circuit and said output flip-flop circuit, respectively, in response to a first input signal for indicating a test mode and a second input signal for indicating a clock advancing operation;
   (6) first memory means, an output of which is connected to control said controlling means to supply said first timing pulse to said input flip-flop circuit;
   (7) second memory means, an output of which is connected to control said controlling means so as to supply said second timing pulse to said output flip-flop circuit; and
   (8) means for inputting test data into said input flip-flop circuit during said test mode; and
   wherein said control means includes means for supplying said first timing pulse and said second timing pulse to said input flip-flop circuit and said output flip-flop circuit, respectively, during a normal mode of operation;
   wherein said control means includes means for stopping said supply of said first timing pulse and said second timing pulse to said input flip-flop circuit and said output flip-flop circuit in response to said first input signal and for supplying said test data to said input flip-flop circuit from said inputting means during a test mode of operation; and
   wherein said control means includes means for controlling the supply and non-supply of said first timing pulse and said second timing pulse to said input flip-flop circuit and said output flip-flop circuit in response to said second input signal, said output of said first memory means and said output of said second memory means during an advanced mode of operation.

2. A microprocessor according to claim 1, wherein said first input signal and said second input signal are received from outside of said microprocessor.

* * * * *